(12) United States Patent
Baer

(10) Patent No.: US 10,623,552 B2
(45) Date of Patent: Apr. 14, 2020

(54) METHOD AND A DEVICE FOR FACILITATING COMMUNICATION BETWEEN END USERS

(71) Applicant: Telia Company AB, Solna (SE)

(72) Inventor: Anders Baer, Årsta (SE)

(73) Assignee: TELIA COMPANY AB (SE)

( * ) Notice: Subject to any disclaimer, the term of this patent is extended or adjusted under 35 U.S.C. 154(b) by 0 days.

(21) Appl. No.: 16/196,071

(22) Filed: Nov. 20, 2018

(65) Prior Publication Data

US 2019/0158649 A1 May 23, 2019

(30) Foreign Application Priority Data

Nov. 23, 2017 (SE) ...................................... 1751443

(51) Int. Cl.
| | |
|---|---|
| *H04M 3/42* | (2006.01) |
| *H04M 1/725* | (2006.01) |
| *H04W 4/16* | (2009.01) |
| *H04M 1/57* | (2006.01) |

(52) U.S. Cl.
CPC ......... *H04M 1/72552* (2013.01); *H04M 1/57* (2013.01); *H04M 1/575* (2013.01); *H04M 1/72519* (2013.01); *H04M 1/72522* (2013.01); *H04W 4/16* (2013.01); *H04M 2203/651* (2013.01)

(58) Field of Classification Search
CPC ....... H04M 1/72552; H04M 2203/651; H04W 4/16
USPC ....................................................... 455/414.1
See application file for complete search history.

(56) References Cited

U.S. PATENT DOCUMENTS

| | | | |
|---|---|---|---|
| 6,442,251 B1 | 8/2002 | Maes et al. | |
| 6,795,429 B1 | 9/2004 | Schuster et al. | |
| 7,933,385 B2 * | 4/2011 | Dickinson | G08B 27/005 370/252 |
| 8,412,174 B2 * | 4/2013 | Khosravi | H04M 1/72522 455/418 |
| 2008/0189364 A1 * | 8/2008 | Landon | G06Q 10/10 709/204 |

(Continued)

FOREIGN PATENT DOCUMENTS

| | | |
|---|---|---|
| CN | 106453779 A | 2/2017 |
| EP | 2186314 B1 | 5/2010 |

(Continued)

OTHER PUBLICATIONS

Extended Search Report, App No. 18205929.5, dated Jan. 7, 2019, European Patent Office, Munich Germany.

(Continued)

*Primary Examiner* — Amancio Gonzalez
(74) *Attorney, Agent, or Firm* — Burr & Forman LLP; Jeffrey H. Kamenetsky

(57) ABSTRACT

The embodiments herein relate to method and a UE for facilitating communication between end users. The method comprises: receiving an incoming communication from a another UE; displaying identification information of the other UE and at least one previously generated note, said note being previously generated by a user of the UE and being associated to the identification information of other UE; and simultaneously displaying validity timing information indication for how long the at least one note should be valid.

16 Claims, 11 Drawing Sheets

(56) References Cited

U.S. PATENT DOCUMENTS

2013/0190057 A1   7/2013   Sahu

FOREIGN PATENT DOCUMENTS

| EP | 2309710 A1 | 4/2011 |
|---|---|---|
| WO | WO 2009/049931 A1 | 4/2009 |

OTHER PUBLICATIONS

Swedish Search Report, App. No. 1751443-1, dated Jun. 26, 2018, pp. 1-2, Swedish Patent and Registration Office, Stockholm, Sweden, Ewa Bjork.

* cited by examiner

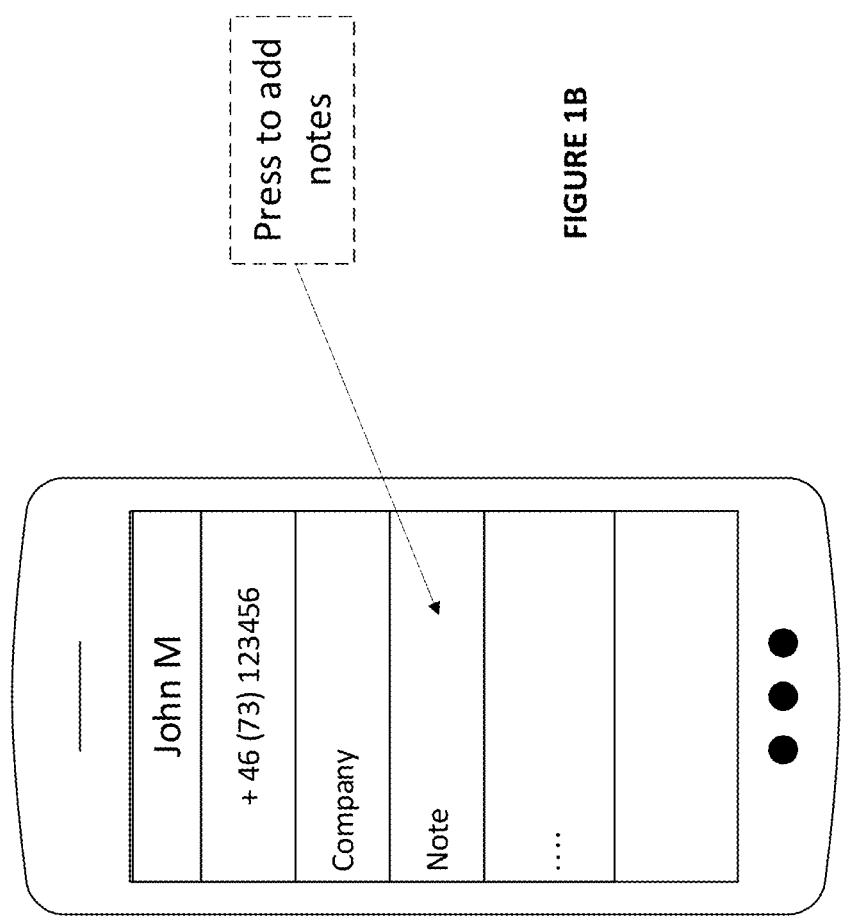

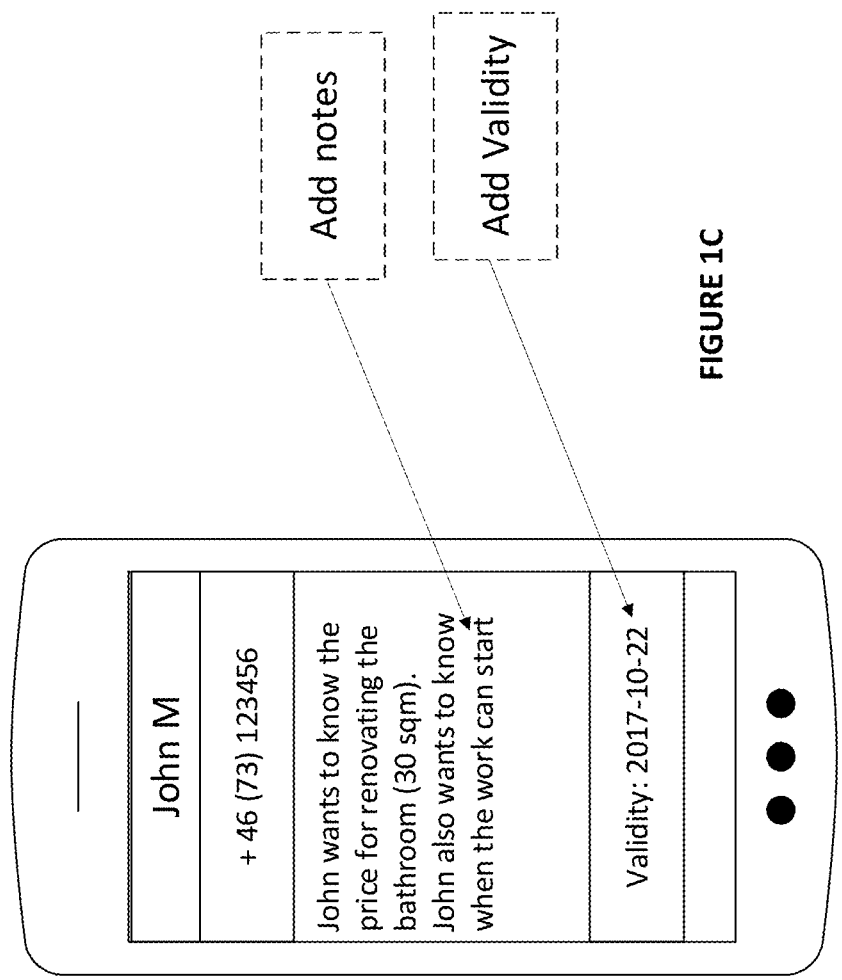

METHOD AND A DEVICE FOR FACILITATING COMMUNICATION BETWEEN END USERS

TECHNICAL FIELD

The present disclosure relates to the field of data communications, and in particular to a method, a user equipment and a computer program product for facilitating communication between parties.

BACKGROUND

The mobile phone has become ubiquitous in today's society and is an integral part of everyday life. The functions and features available on a mobile phone continue to expand, including apps, a web browser, virtual keypads, touchscreens, WiFi connectivity, email, texting, etc.

In a conventional practice, when a first UE (e.g., a mobile or smart phone) of a caller/calling party is used to place a call to a second UE of a called party, the phone number or other identification associated with the first UE and possibly the name of the calling party are presented to the user of the second UE, e.g., on a display. The name of the calling party is displayed if previously stored in a contact list of the first UE. Since the called party is typically unaware of the purpose of the calling party, it is frequently the result that a first phone call between the two parties will only result in a plan to have a second phone call at a later point in time. As the number of calls made by an individual during the course of a day for personal and/or business reasons continues to increase, it has become increasingly difficult to memorize topics or subjects of discussions or plans for future calls. One approach is to make a note in the notebook of a UE and associate the note to a party and then search for the note later on. However, due to the wide range of tasks that a user may be involved in, due to increasing usability of telephones and the resulting increase in the amount of time a user spends on their phone, it is increasingly common that a user will not remember that he/she has made a note the next time a call is received from the user to which the note is associated. In addition, a note may become irrelevant and outdated the next time the same user makes the call.

SUMMARY

It is an object of embodiments herein to solve the above problems by providing a method, a computer program product and a user equipment for facilitating communication between a calling party and a called party by automatically displaying at least one note to a called party.

According to an aspect of embodiments herein, there is provided a method comprising: receiving, at a first user equipment (UE), an incoming communication from a second UE; displaying, at the first UE, identification information of the second UE and at least one previously generated note, the note being generated by a user of the first UE and the note being associated to the identification information of the second UE. The method further comprises, simultaneously displaying validity timing information indicating for how long said at least one note should be valid for the user of the first UE.

According to an embodiment, the method further comprises, updating or adapting the validity timing information.

According to another embodiment, the method comprises storing the validity information and the note in the first UE or in a network node of a service provider. When stored in the network node, the first UE may send a request, to the network node, for the note and for the validity information.

According to another aspect of embodiments herein, there is provided a first UE comprising a processor and a memory containing instructions executable by the processor, wherein the first UE is operative to: receive an incoming communication from a second UE; display identification information of the second UE and at least one previously generated note, said note being generated by the user of the first UE and being associated to the identification information of the second UE, and simultaneously display validity timing information indicating for how long said at least one note should be valid for the user of the first UE.

According to another aspect of embodiments herein, there is provided a computer program product including computer program code or instructions, embodied on a memory or a computer readable storage medium, which when executed on at least one processor of a first UE, according to embodiments herein, cause a processor of the first UE to carry out the method previously described.

An advantage with embodiments herein is to automatically display a previously generated note that includes the most recent information on a topic and/or subject of discussion when a called party receives a communication from a calling party.

Another advantage is that a validity timing information is also displayed together with the note so the called party is made aware of an automatic deletion of the note when the note is no longer valid.

Another advantage is that the called party may adapt the validity time of the note, e.g., by increasing the time or decreasing the time. This way, the note is not deleted automatically upon expiration of the validity timing information. The user or the called party may also get a notification of the event that the validity time is about to expire and let the party decide to delete or extend the validity time.

Additional advantages are achieved by the present embodiments which will become apparent from the following detailed description when considered in conjunction with the accompanying drawings

BRIEF DESCRIPTION OF THE DRAWINGS

Example of embodiments herein are described in more detail with reference to attached drawings in which:

FIG. 1B is an exemplary diagram of the UE depicting details, including a note field, associated with a contact from the list of recent calls.

FIG. 1C is an exemplary diagram of the UE displaying the content of the note and validity timing information.

DETAILED DESCRIPTION

In the following, a detailed description of the exemplary embodiments is presented in conjunction with the drawings to enable easier understanding of the solutions(s) described herein.

Figure 1A:
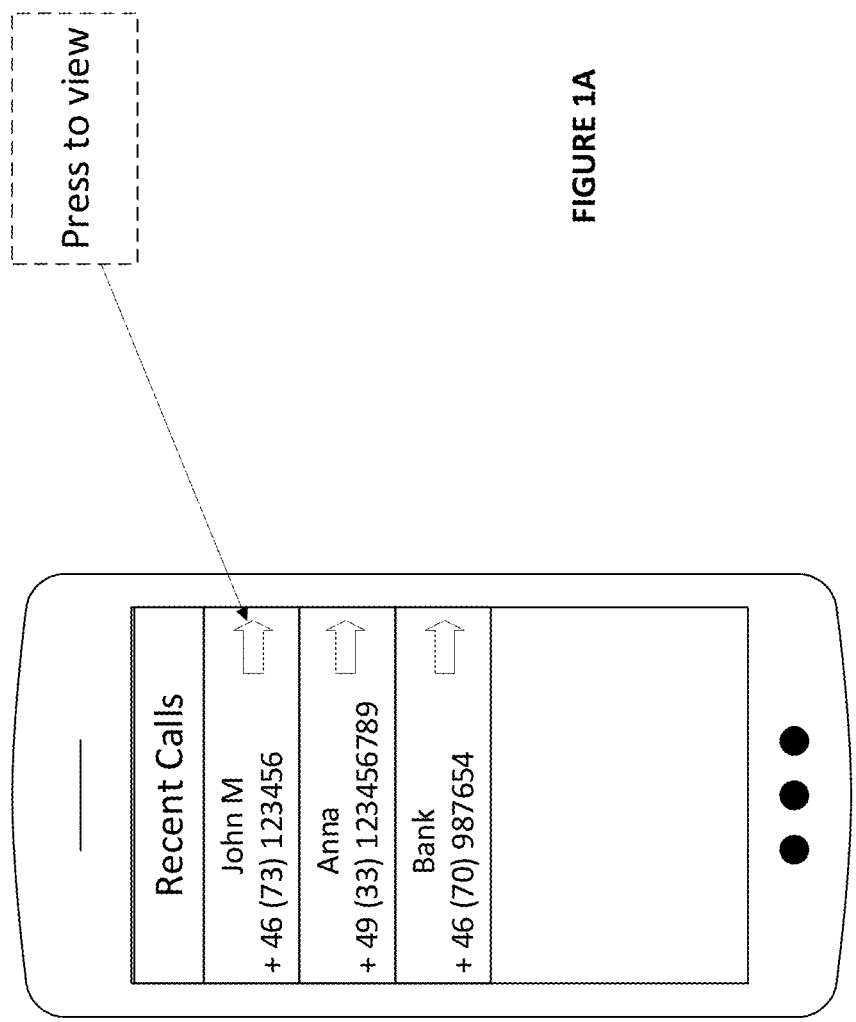
FIG. 1A is an exemplary diagram of a user equipment (UE) wherein a list of recent calls are shown.
Figure 1D:
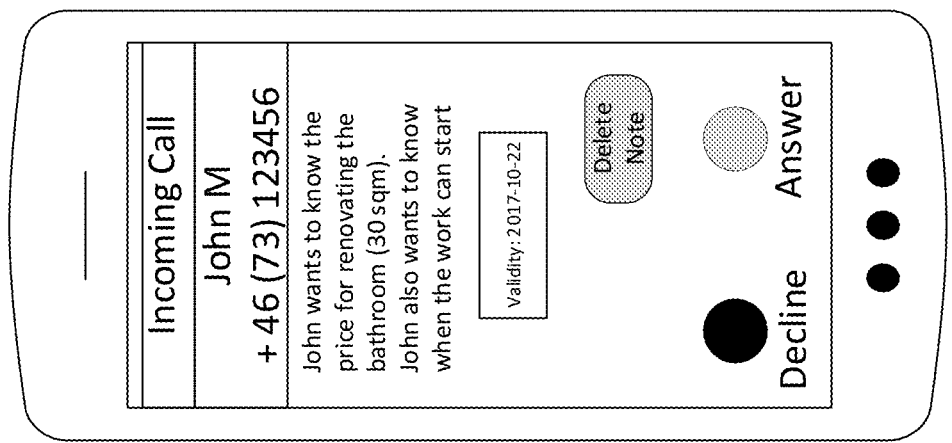
FIG. 1D is an exemplary diagram of the UE displaying topics including the note and validity timing information associated with an incoming call.

FIGS. 1A-1D illustrate an example of a UE in the form of a portable device or a mobile phone wherein the exemplary embodiments herein may be applied. As shown in FIG. 1A, a list of recent calls received or made by a user of the UE is shown (e.g., "John M", "Anna" and "the bank"). Identification information, e.g., the CallingID or the phone number of each one of them is also displayed. The contact information from each one of them may be previously stored in the phonebook of the user. Assuming that the user of the UE recently communicated with "John M" on a topic and that they both agree to have yet a new call and discuss more on the topic.

The user may then click or press on contact "John M" to view additional information. Within this information there is a field called, e.g., "Note" in addition to other information, e.g., "Company", "email-address" etc. (see FIG. 1B). The user clicks or presses on the field "Note" to create or generate a note of a desired media (text, image, and/or video). In this example, the desired media is in the form of text. In our example, the topic of the previous call between the user and "John M" related to "Bathroom renovation" that "John M" is interesting to do at home. The user creates the note, e.g.: "John wants to know the price for renovation of the bathroom (30 sqm). John also wants to know when the work can start". In addition to this note and according to embodiments herein, validity timing information indicating how long the note should be valid is also added (see FIG. 1C). When the user receives a new communication or call from "John M" (see FIG. 1D), the note and the validity information entered previously by the user are displayed before the user decides whether to accept or reject the call. The CallingID of "John M" is also displayed. The note is associated to the CallingID. The user may decide to delete the note if the note is no longer needed. The user may also "click or press" on the "validity timing information" to adjust or adapt it. This may be the case if the user needs additional time for providing an answer to "John M" on the requested information. The note and associated information (i.e., the validity timing information) may be stored in the UE or in network node of a service provider (SP) as will be described.

Figure 2:
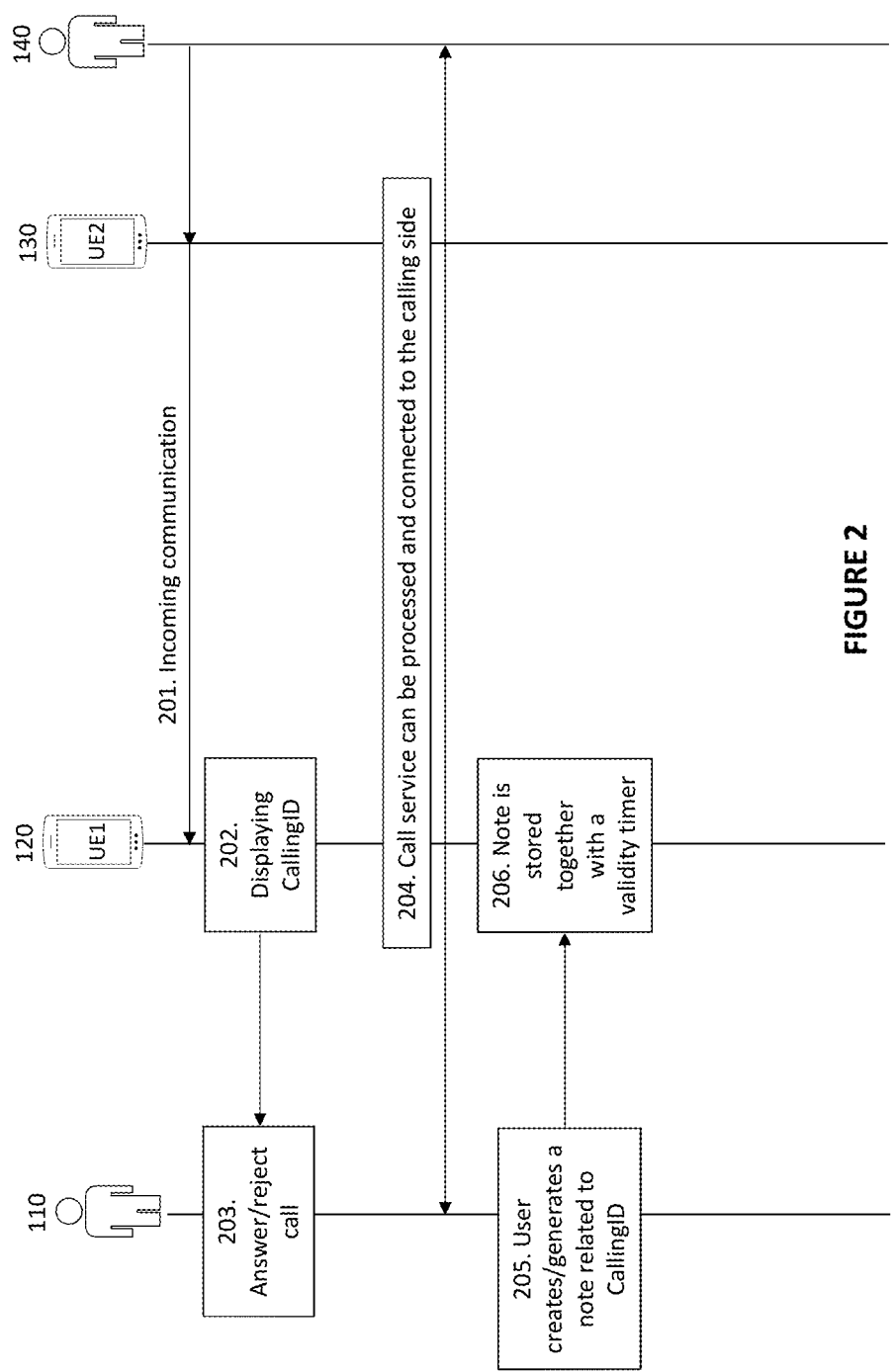
FIG. 2 is an exemplary diagram of a use case involving the generation of the note following the receipt of a communication.

FIG. 2 illustrates an exemplary diagram of a use case involving the generation of the note following the receipt of a communication as previously described.

As shown:

201. A first UE, UE1 120 of user 110 receives an incoming communication (a call) from a second UE, UE2 130 of another user 140. In this example, UE1 is referred to as the called UE and UE2 is referred to as the calling UE.

202. The CallingID (e.g., the mobile number) of the calling UE, UE2 is displayed at UE1.

203. User 110 decides how to handle the call (i.e., to answer or reject the call). In our example, we assume that user 110 decides to accept/answer the call.

204. The call service is then processed and connected to the calling user 140.

205. After completion of the call, user 110 decides to generate or create a note with "important" information related to a topic of the discussion between the users. The note is related to the CallingID of UE2 130.

206. The note is then stored in UE1 120 together with the validity timer.

Figure 3:
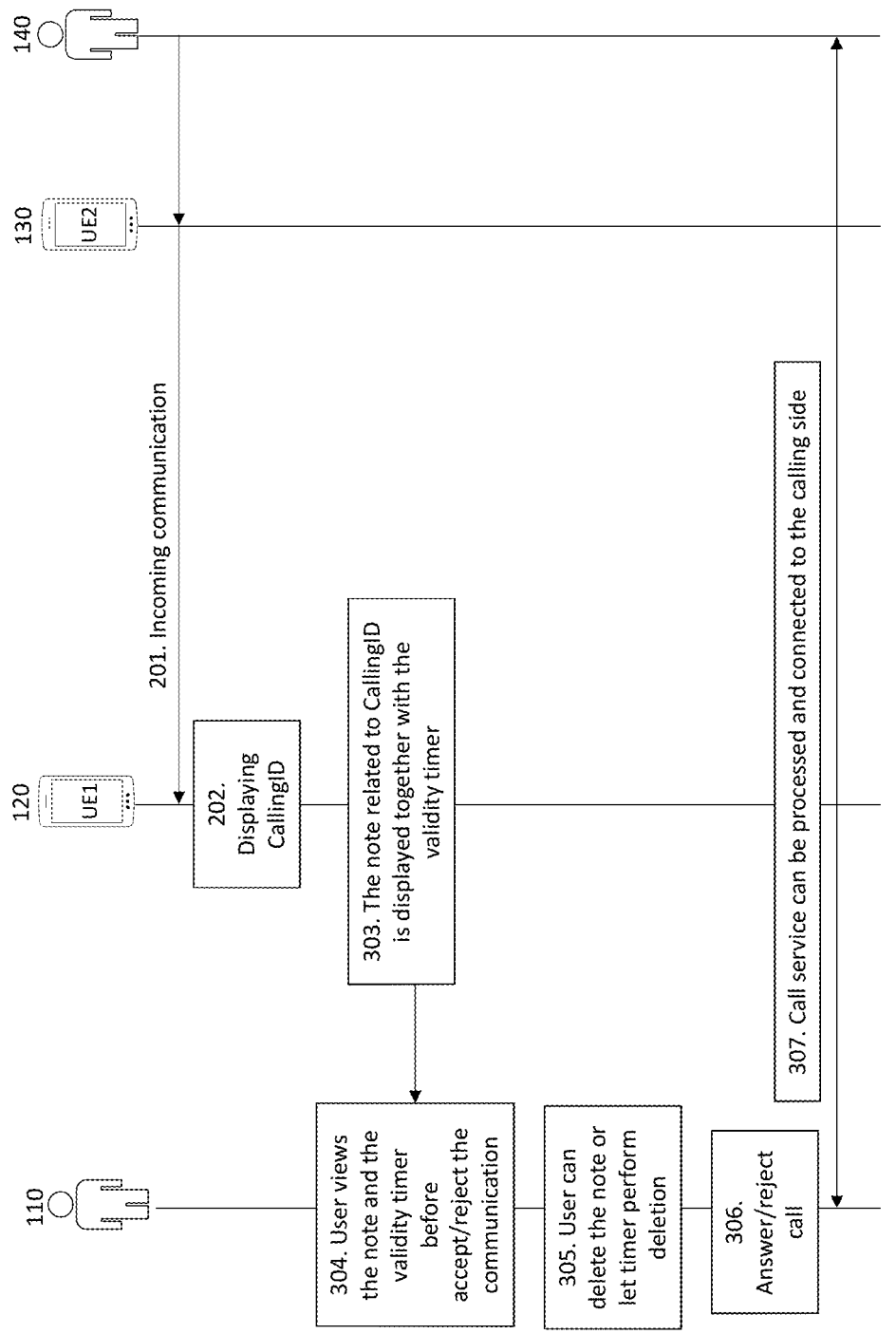
FIG. 3 is an exemplary diagram depicting the display of the note and validity timing information upon reception of a subsequent communication.

Referring to FIG. 3, there is depicted the case involving the display of the note and the validity timing information previously stored in UE1 120. Actions 201 and 202 are those previously described in conjunction with FIG. 2, i.e., receipt of an incoming communication from a user 140 of UE2 and the display of the CallingID, or phone number of UE2. The name of user 140 or any appropriate identification information may also be displayed together with the CallingID.

In 303 the previously stored note related to CallingID is displayed on UE1 120 together with a validity timer (or validity timing information).

In 304 user 110 of UE1 views the note and the validity timer. This way, the user 110 remembers the topic of the discussion he/she previously had with user 140. User 110 may decide to take the call or reject it. The user 110 may also delete the note or let the validity timer perform the deletion upon expiration 305. Assuming the user 110 decides to answer the call 306, the call service can proceed 307 and the users 110 and 140 may resume the telephone call. After completion of the call, the user 110 may amend/delete the note, or the user 110 by means of UE1 120 may adapt or update the validity timing information.

This is advantageous if, e.g., the users agree to contact each other again to discuss the same topic. As an example, assume that the user 110 was initially requested by user 140 to provide information related to a topic. User 110 generates a note and validity timing information related to CallingID of UE 130 and when user 140 calls user 110 again, user 110 views on display of UE1 120 the note but user 110 could not provide all information required by user 140. User 110 and user 140 agree to have yet a new call. User 110 increases the validity information associated to the note and may also update the note. The next time user 140 calls user 110, user 110 views the (updated note) and the validity information and provide to user 140 with the requested information. Thereafter user 110 may select to delete the note and the validity timing information when not needed any more.

The validity timing information may be manually set by user 110 or randomly (and dynamically) generated in UE1 120.

A further advantage with the validity timing information indicating how long a note is valid for is that the phonebook of a UE does not fill up with CallingIDs (or numbers) that are only of importance for a short time period. As an example, a real estate agent that has to keep control of all CallingIDs that represent users or clients that are interested in a buying a specific house. Using the teaching of the embodiments herein, the real estate agent may, for each client, generate a note associated to the CallingID of the client and the validity timing information. This helps the agent identify important data or information related to the last call from the client. When the house is sold, the notes may be deleted upon expiration of the validity timing information in order not to fill up the phonebook of the agent with outdated information.

Figure 4:
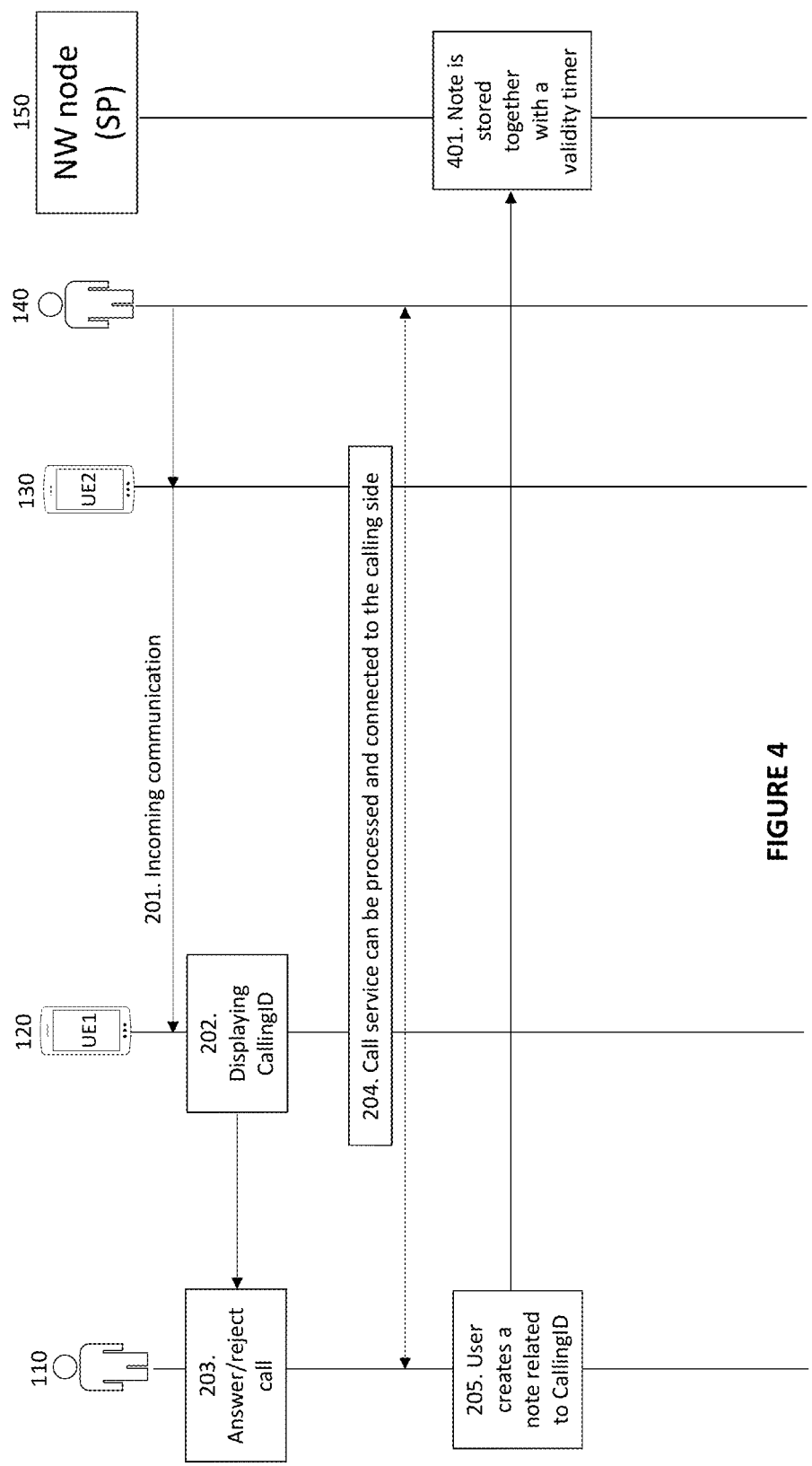
FIG. 4 is an exemplary diagram displaying another use case involving the generation of the note following the receipt of a communication and the storing of the note in the network.

Referring to FIG. 4, there is illustrated a use case where the generated note is stored in a network node (e.g., an application server) of a service provider (SP). Actions 201-205 are similar to actions 201-205 shown in FIG. 2 and discussed earlier. Action 401 refers to the case where the generated note is stored in the network node 150 of the SP together with the validity timer (or validity timing information). It should be noted that the validity timer may be generated by the user 110 or by the network node 150 upon receiving the note. The SP may provide such a service allowing users to store notes and related timing information in the network side. A SP may also handle the phonebook of a user for the purpose of handling notes connected to CallingIDs together with validity information.

Figure 5:
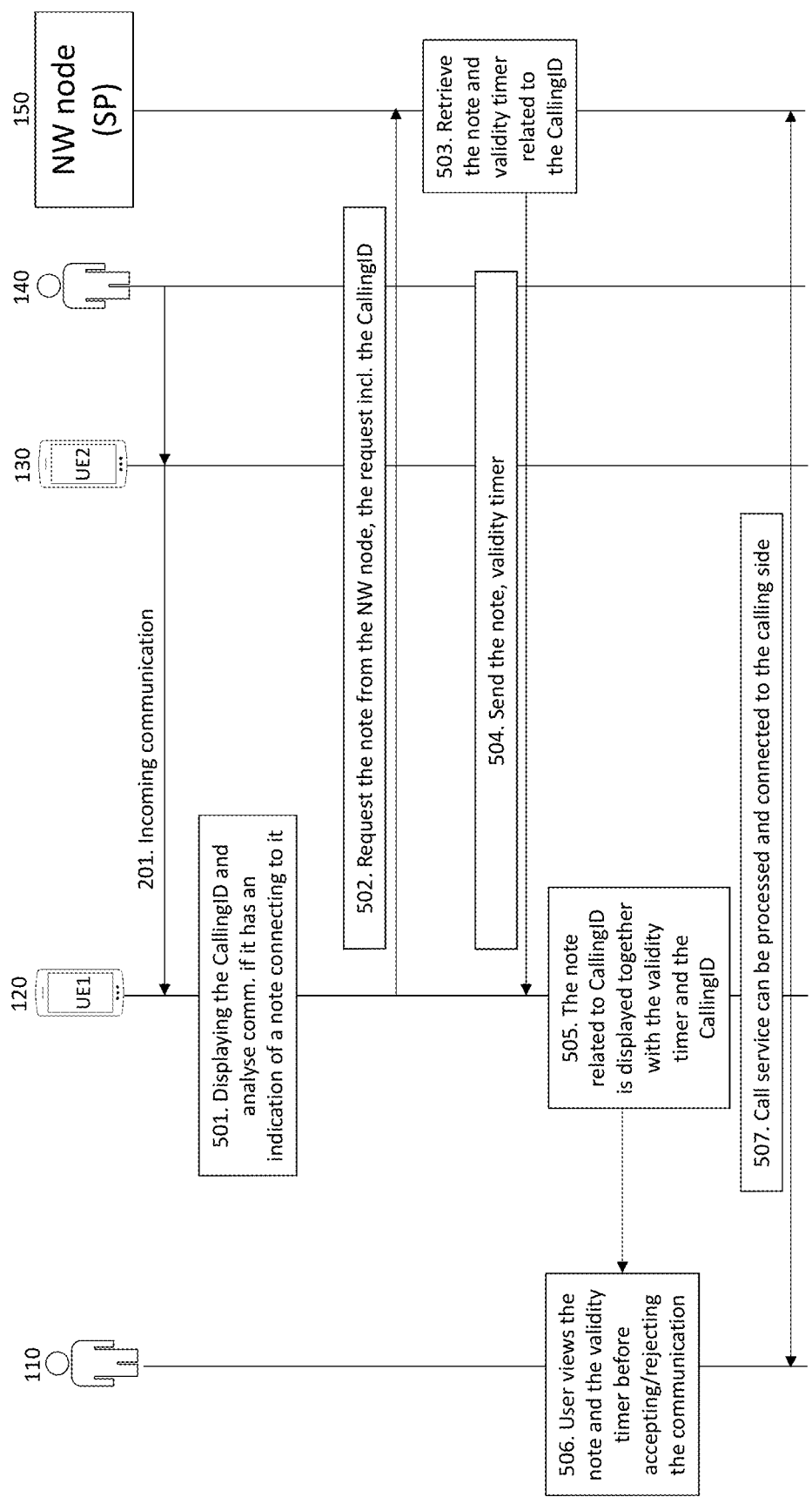
FIG. 5 is an exemplary diagram depicting the retrieval of the note from the network and the display of the note and validity information upon reception of a subsequent communication.

Referring FIG. 5, there is illustrated the procedure on how to retrieve the note and validity information from the network node of the SP according to an embodiment herein. In 201 an incoming communication is received at UE1 120 from UE2 130 having a CallingID. The CallingID is displayed and UE1 analyzes the communication to determine if a note (previously generated by user 110 of UE1 120) is connected to it. As an example, when UE1 displays the phone number (CallingID) of UE2 140, information is also displayed indicating that a note associated to the CallingID is available for download from the network node 150. A request 502 is sent from UE1 to the network node to download the note and the validity timing information. The request 502 includes the CallingID. One reason could be that there are multiple requests in parallel from different UE, and the network node 150 needs to be able to differentiate between the requests. At the network node 150, the note is matched together with the CallingID (or communication ID) and the note and validity timing information (or validity timer) are retrieved together with the CallingID 503 and the network node 150 sends the note and related information to UE1, 504. The network node 150 may be configured with a function that searches and matches the CallingID (of UE2) in the request to determine if there is a note related to it. Hence, the network node 150 may be provided with a network service for the purpose of retrieving the note and the validity timing information. The downloaded information is displayed 505 together with the CallingID and the user 110 views the downloaded information before deciding whether to access or reject the call 506. Assuming the user 110 accepts the call, the call service can be processed and connected to the calling side 507. As in the previous embodiments, the validity timing information may be updated or adapted by the user 110. In this case, the updated note may be uploaded and stored in the network node 150. Alternatively, the user 110 may select to delete the note by sending a request for deletion of the note (and the related validity timing information) to the network node 150.

Figure 6:
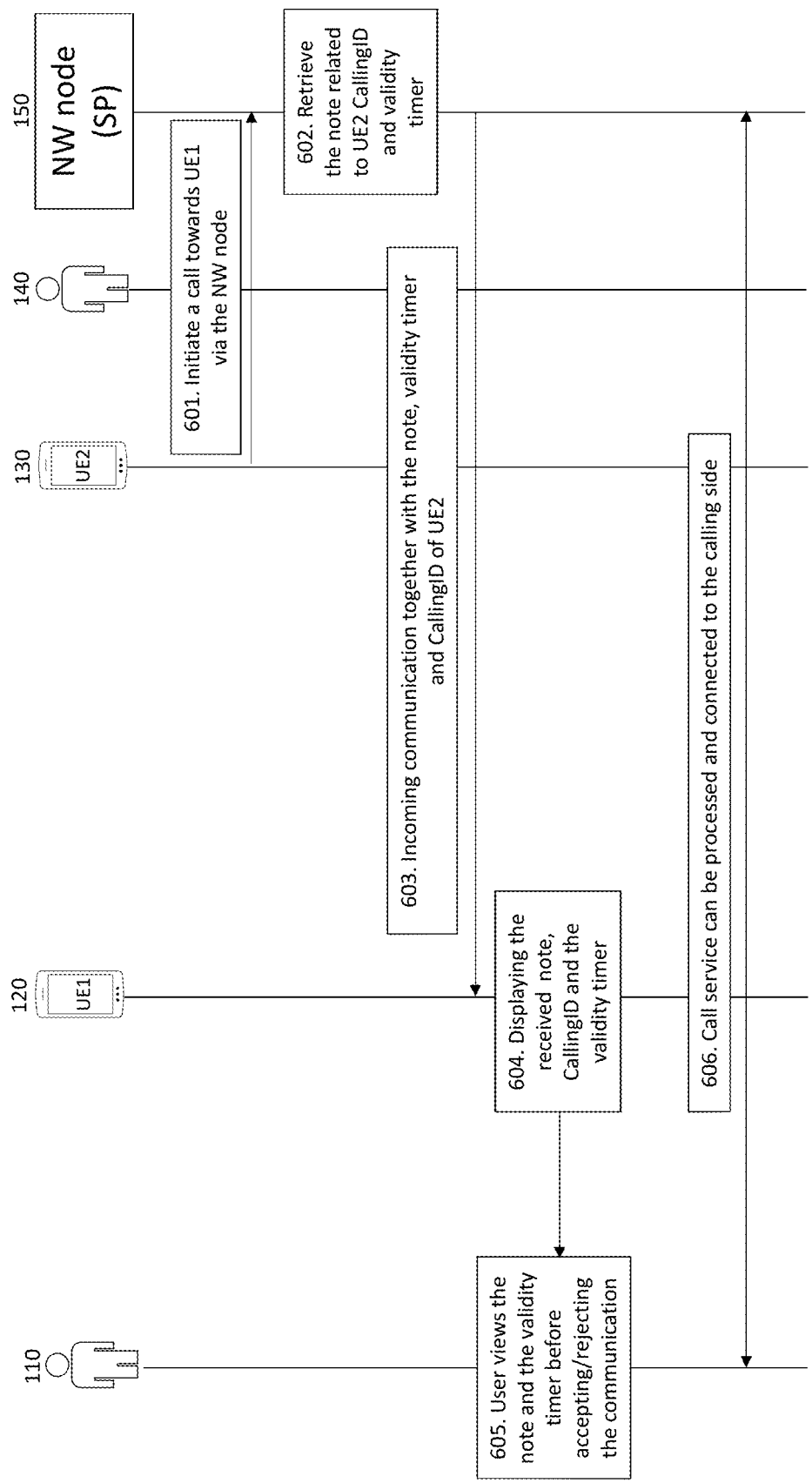
FIG. 6 is another exemplary diagram depicting the retrieval of the note from the network and the display of the note and validity information upon reception of an incoming communication.

Referring FIG. 6, there is illustrated another use case in which the network node 150 (or application server) hosting a service is triggered to retrieve a previously generated note and send it to UE1 together with an incoming communication. As previously described, the note is related to the CallingID of UE2 130. So in this scenario, the network service is configured to indicate that UE2 CallingID has a relation in the form of a note with an ID of UE1. This can be provided to users as a subscription service that is triggered to send the UE1 note connected to UE2 CallingID together with the incoming communication. The note is previously generated by UE1 and stored in the network node 150. As shown in FIG. 6, triggering the sending of the note and related information (validity timer) to UE1 is performed by UE2 initiating a call 601 towards UE1 via the network node 150. If there is a note stored in the network node 150 that is related to the CallingID of UE2, the network node 150 retrieves 602 the note of UE1, the CallingID of UE2 and the validity timer and calls UE1 120. The incoming communication 603 is received at UE1 120 together with the note, the CallingID of UE2 and the validity timing information. In this case, there is no need for UE1 120 to send a separate request for the retrieval of the note as was the case in FIG. 5. In 604 the note, the CallingID and the validity timer are displayed on UE1. The user 110 views the received information before deciding whether to access or reject the call 605. Assuming the user 110 accepts the call, the call service can be processed and connected to the calling side 606.

Figure 7:
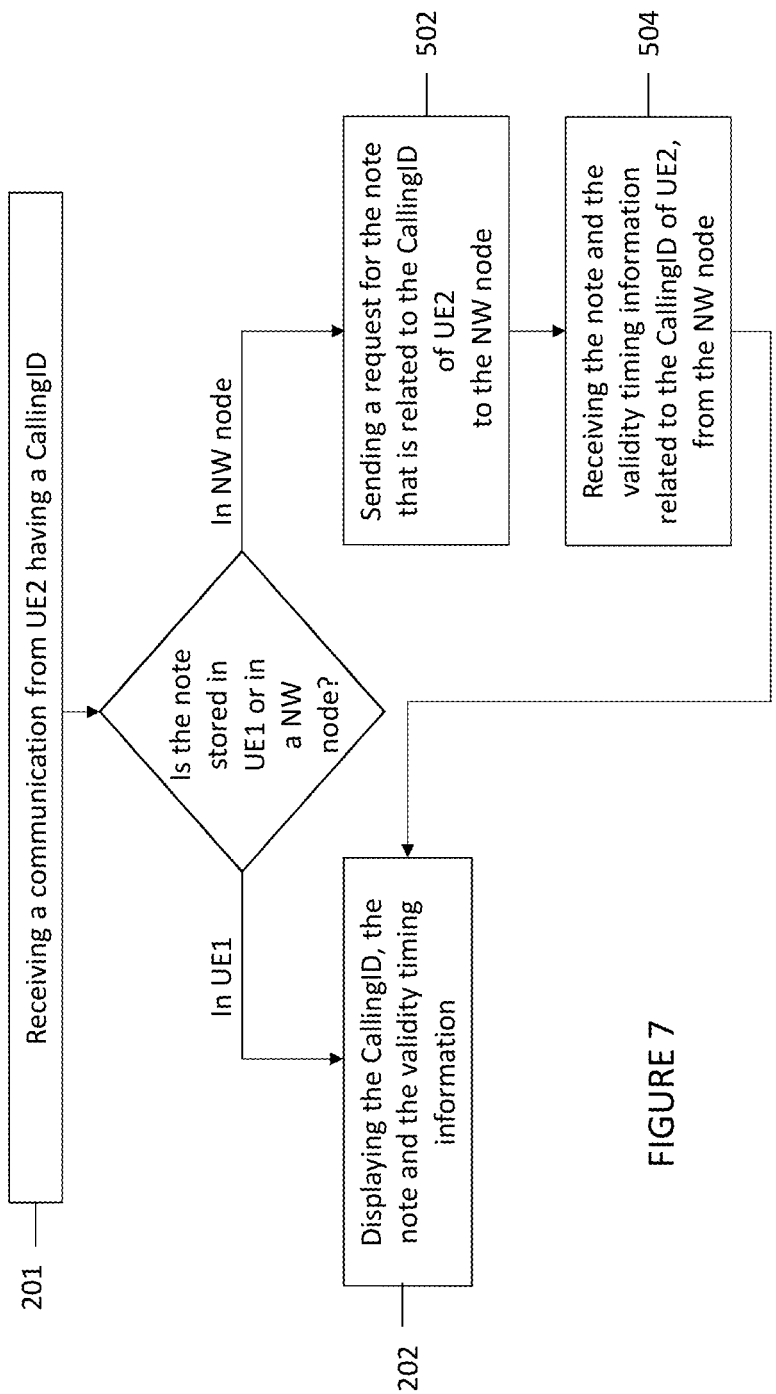
FIG. 7 illustrates a flowchart of a method performed by a UE according to some exemplary embodiments herein.

Referring to FIG. 7, there is illustrated a flowchart of a method performed by a UE according to some previously described embodiments. The method comprises, receiving (201), at the first UE (UE1), an incoming communication from the second UE (UE2). If the note is stored in the first UE, the method comprises (202) displaying, at the first UE, identification information of the second UE (e.g., a phone number or a CallingID), and at least one previously generated note, said note being previously generated by the user of the first UE and being associated to the identification information of the second UE, and simultaneously displaying the validity timing information. The name of the user of the second UE may also be displayed, provided the CallingID and the name are previously stored in (a phonebook) the first UE.

If the note is stored in the network (NW) node, the method comprises, sending (502) a request for the note that is related to the CallingID of UE2 to the NW node; the request includes the CallingID; receiving (504) the note and the validity timing information from the NW node and displaying the CallingID, the note and the validity timing information for the user of UE1. As mentioned earlier, the note and related information may be received by UE1 together with the incoming information instead of sending a request to the NW node.

As previously described, the user of UE1 may select to delete the note prior to expiration of the validity timer. The validity timing information may be adapted or updated. For example, the user may increase the validity timer when desired. The validity timing information may be dynamically updated when the note is modified or updated. If the user does not select to (manually) delete the note, the note is automatically deleted when the validity timer expires. The user of UE1 may also get a notification of the event that the validity time is about to expire and let the user decide to delete or extend the validity time. The user of UE1 may also get a notification of the event that the validity time of the note expired and let the user decide to delete or to extend the validity time.

Figure 8:
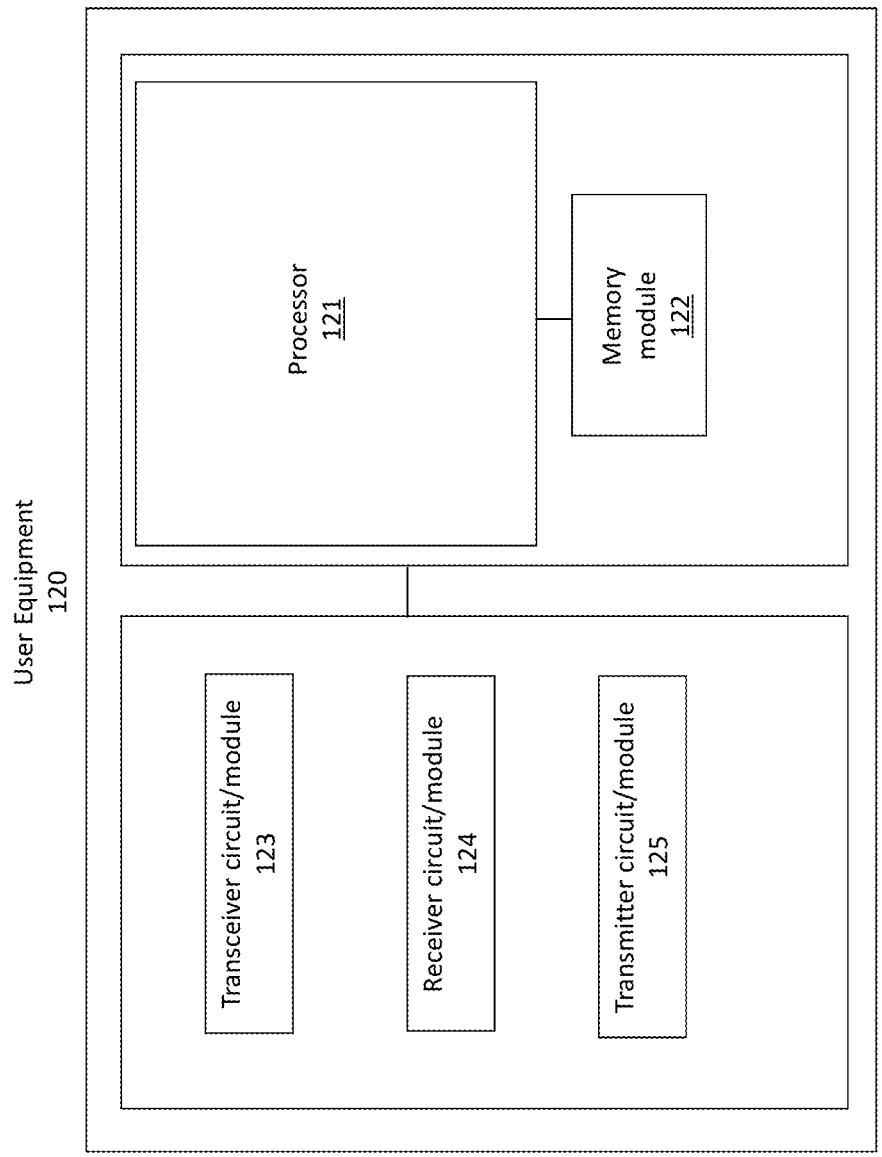
FIG. 8 illustrates an exemplary block diagram of a UE according to embodiments herein.

Referring to FIG. 8, there is illustrated an exemplary block diagram of a UE 120 (a first UE) according to exemplary embodiments herein. UE 120 comprises a processing circuit or a processing module or a processor 121; a memory module 122; a receiver circuit or receiver module 124; a transmitter circuit or transmitter module 125; and a transceiver circuit or transceiver module 123 which may include the transmitter circuit 125 and the receiver circuit 124. The UE 120, for example, a mobile phone, a cell phone, a smart phone, a tablet, a PDA, etc., may support any of radio access technologies including 2G, 3G, 4G, 5G, Wifi, Wimax or a combination thereof. The UE 120 may include a camera, an audio codec coupled to a speaker, a microphone, and an earphone jack. The UE 120 also includes a display controller (e.g., a touchscreen controller) which provides a graphical output to a display and in input from a touch input device. Collectively, the display device and touch input device may be referred to as touchscreen. The UE 120 is capable in communicating wirelessly to the Internet via WiFi or any wireless access technology mentioned above. The UE 120 may include additional component, entities, means or devices not shown in FIG. 8.

The processing module/circuit 121 includes a processor, microprocessor, an application specific integrated circuit (ASIC), field programmable gate array (FPGA), or the like, and may be referred to as the "processor 121." The processor 121 controls the operation of the UE 120 and its components. Memory (circuit or module) 122 includes a random access memory (RAM), a read only memory (ROM), and/or another type of memory to store data and instructions that may be used by processor 121.

The processor 121 is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 121 to carry out the operations of the UE 120 disclosed herein.

The (first) UE 120 is operative to: receive an incoming communication from a second UE 130; display identification information (e.g., CallingID) of the second UE 130 and at least one previously generated note. The UE 120 is further operative to simultaneously display a validity timing information indicating for how long the at least one note should be valid for the user of the UE 120. The at least one note being generated by the user of the UE 120 and being associated to the identification information of the second UE 130. The UE 120 is further operative to adapt and/or update the validity information. The note may also be adapted. The UE 120 may store the generated note and the validity timing information in the memory 122 or in a network node of a service provider. The UE 120 is operative to send the generated note and validity timing information to the network node. Alternatively, the validity timing information may be generated in the network node upon receipt of the note from the UE 120. If the note is stored in the network node, the UE 120 is operative to send a request for the note and the validity timing information to the network node. The request includes the CallingID of the second UE. In either case, the UE 120 is operative to display the note and the validity timing information prior to deciding to accept or reject the incoming communication from the second UE 130. The UE 120 is further operative to selectively delete the note prior to expiration of the validity timing information. If the UE 120 does not selectively delete the note, the note is automatically deleted upon expiration of the validity timing information. UE1 120 may also display a notification of the event that the validity time is about to expire and let the user of UE1 decide to delete or extend the validity time. The user of UE1 may also get a notification of the event that the validity time of the note expired and let the user decide to delete or to extend the validity time.

There is also provided a computer program comprising instructions which when executed on at least one processor 121 of the UE 120 according to embodiments herein, cause the at least one processor 121 to carry out the method previously described. Also a carrier containing the computer program is provided, wherein the carrier is one of a computer readable storage medium; an electronic signal, optical signal or a radio signal.

Throughout this disclosure, the word "comprise" or "comprising" has been used in a non-limiting sense, i.e., meaning "consist at least of." Although specific terms may be employed herein, they are used in a generic and descriptive sense only and not for purposes of limitation.

The invention claimed is:

1. A method for facilitating communication between a user of a first User Equipment, UE, and a user of a second UE, the method comprising:
   receiving, at the first UE, an incoming communication from the second UE;
   displaying, at the first UE, identification information of the second UE and at least one previously generated note, said at least one previously generated note being generated by the user of the first UE and being associated to the identification information of the second UE; and
   simultaneously displaying at least one of validity timing information and a validity timer, indicating for how long said at least one previously generated note should be valid, the validity timing information and validity timer being generated by the first UE.

2. The method according to claim 1, further comprising at least one of adapting and updating the validity timing information by the user of the first UE.

3. The method according to claim 1, wherein the at least one previously generated note and the validity timing information are stored in the first UE.

4. The method according to claim 1, wherein the at least one previously generated note and the validity timing information are stored in a network node of a service provider.

5. The method according to claim 4, further comprising sending a request for the at least one previously generated note and for the validity timing information to the network node of the service provider.

6. The method according to claim 1, wherein displaying the at least one previously generated note is performed prior to the user deciding whether to accept or reject the incoming communication from the second UE.

7. The method according to claim 1, wherein the incoming communication is an incoming call and the identification information of the second UE is at least one of a telephone or mobile number and a name of the user of the second UE.

8. The method according to claim 1, further comprising selectively deleting the at least one previously generated note prior to expiration of the validity timing information.

9. A first user equipment, UE, for facilitating communication between a user of the first UE and a user of a second UE, the first UE comprising a processor and a memory containing instructions executable by the processor, wherein the first UE is operative to:
   receive an incoming communication from the second UE;
   display identification information of the second UE and at least one previously generated note, said at least one previously generated note being generated by the user of the first UE and being associated to the identification information of the second UE; and
   simultaneously display validity timing information indicating for how long said at least one previously generated note should be valid for the user of the first UE, the validity timing information being generated by the first UE.

10. The first UE according to claim 9, wherein the first UE is operative to adapt or update the validity timing information.

11. The first UE according to claim 9, wherein the first UE is operative to store the at least one previously generated note and the validity timing information.

12. The first UE according to claim 9, wherein the first UE is operative to send the at least one previously generated note and the validity information to a network node of a service provider for storage.

13. The first UE according to claim 12, wherein the first UE is operative to send a request for the at least one previously generated note and for the validity timing information to the network node.

14. The first UE according to claim 9, wherein the first UE is operative to display at least the at least one previously generated note and the validity information prior to accepting or rejecting the incoming communication from the second UE.

15. The first UE according to claim 9, wherein the incoming communication is an incoming call and the identification information is a telephone or mobile number.

16. The first UE according to claim 9, wherein the first UE is operative to selectively delete the at least one previously generated note prior to expiration of the validity timing information.

* * * * *